(12) United States Patent
Chang

(10) Patent No.: US 6,523,751 B2
(45) Date of Patent: Feb. 25, 2003

(54) SCANNING APPARATUS

(76) Inventor: Yu-Chun Chang, 4F, No. 225, Chin-Lung Rd., Nei-Hu Dist., Taipei (TW)

( * ) Notice: Subject to any disclaimer, the term of this patent is extended or adjusted under 35 U.S.C. 154(b) by 98 days.

(21) Appl. No.: 09/736,215

(22) Filed: Dec. 15, 2000

(65) Prior Publication Data

US 2002/0074411 A1 Jun. 20, 2002

(51) Int. Cl.[7] .................................................. G06K 7/10
(52) U.S. Cl. .............................. 235/462.43; 235/462.25
(58) Field of Search ....................... 235/462.43, 462.37, 235/462.25, 462.32, 462.36

(56) References Cited

U.S. PATENT DOCUMENTS 5,581,067 A * 12/1996 Grosfeld et al. ....... 235/462.36
5,874,720 A * 2/1999 Dvorkis et al. ........ 235/462.32
5,900,617 A * 5/1999 Dvorkis et al. ........ 235/462.43
6,360,949 B1 * 3/2002 Shepard et al. ........ 235/462.37

* cited by examiner

Primary Examiner—Thien M. Le
Assistant Examiner—Lisa M. Caputo
(74) Attorney, Agent, or Firm—Bacon & Thomas

(57) ABSTRACT

A scanning apparatus used in a barcode device includes an anchor frame, a twist means located in the anchor frame and a driving means located on two sides of the twist means. The twist means includes a formed member made from a material of high elasticity coefficient such as silicon rubber or rubber. When the driving means is magnetized and generates a magnetic force to produce a corresponding force against a magnetic element, the formed member is twisted. When the magnetic force is absent, the formed member will turn in an opposite direction because of counter reaction force and the inertia thereof, and thereby concentrically turn a reflection element located thereon for projecting light to the barcode of an object to be scanned.

6 Claims, 5 Drawing Sheets ns apparatus
SCANNING APPARATUS

BACKGROUND OF THE INVENTION

This invention relates to improvement for scanning apparatus and particularly improvement for scanning apparatus used in barcode devices.

Photoelectric technology has been developed and evolved to become a mature technique now. It has been widely employed in a lot of fields such as data transmission, sensor application, medical care, and the like. Using in barcode applications is even more popular than in other areas. In the barcode applications, a barcode device has a laser light source projecting laser light to a reflection mirror of a scanning apparatus. The reflection mirror moves with the scanning apparatus and projects the laser light to a barcode attached to an object. In the mean time, the barcode device reads the barcode synchronously.

The optical scanner in the barcode device equipped with light type scanner is now available in the market place. There are a number of patents being announced. For instance, U.S. Pat. No. 5,168,149 discloses a scanning device which employs the elasticity and inertia of Mylar strip to drive the reflection mirror of the scanning device moving reciprocally for the projecting laser light spot hit the reflection mirror to become a straight line, or uses magnetic force of a strut-shaped magnet and a ferrite frame to generate reciprocal motion to drive the reflection mirror for the laser light spot projected on the reflection mirror to become a straight line for scanning the barcode on the object effectively.

However production of the scanning devices set forth above needs high degree of precision. Control of the physical property of the materials is difficult. Manufacturing process is complicated and assembly of the product is time-consuming. Furthermore, accuracy of laser light reflecting on the barcode is difficult to adjust. The device is also easier to get breakdown or malfunction. All this creates a lot of problems in production and utilization.

Applicant has previously submitted a design which uses a spiral hairspring structure. The hairspring may produce a circular movement and drive a spindle. There is a holding seat mounted on the spindle for holding a reflection mirror. A magnet is fixed at two sides or the rear side of the holding seat. When a coil is magnetized and generates magnetic force, a corresponding force will be generated on the fixed magnet to produce strain on the spiral hairspring. When the magnetic force on the coil is absent, the spiral hairspring will have a counter reaction force and inertia to move reciprocally to drive the spindle. Then the reflection mirror and spindle will turn concentrically and synchronously. The light spot projected on the reflection mirror will scan to form a straight line. Hence if the coil is magnetized at suitable time, the movement will become continuously.

However the construction of the hairspring and spindle is relatively complex. It also needs high degree of precision. Material selection and fabrication are more difficult. Material variation for same movement angle is greater and the response is slower.

SUMMARY OF THE INVENTION

In view of aforesaid disadvantages, it is therefore an object of this invention to provide an improvement that employs a high elasticity coefficient material as driving force for scanning operation. Material variation for same movement angle during scanning operation is less. Response time is faster. As a result, barcode scanning speed may be increased.

Another object of this invention is to simplify the structure. There is no spindle. Production process is simpler and assembly is easier. There is also no friction incurred during movement. It is thus a more desirable design of scanning apparatus for the barcode devices.

In order to achieve aforesaid objects, in this invention there is a twist means which includes a formed member made from a material of high elasticity coefficient such as silicon rubber, rubber or the like. When a driving means is magnetized, the generated magnetic force will produce a corresponding force against magnetic elements and twist the formed member. When the magnetic force is absent, the formed member will move a reflection element concentrically results from the counter reaction force and the inertia thereof And light will be projected on the barcode of an object to be scanned.

BRIEF DESCRIPTION OF THE DRAWINGS

The invention, as well as its many advantages, may be further understood by the following detailed description and drawings, in which.

DESCRIPTION OF THE PREFERRED EMBODIMENTS

Figure 1:
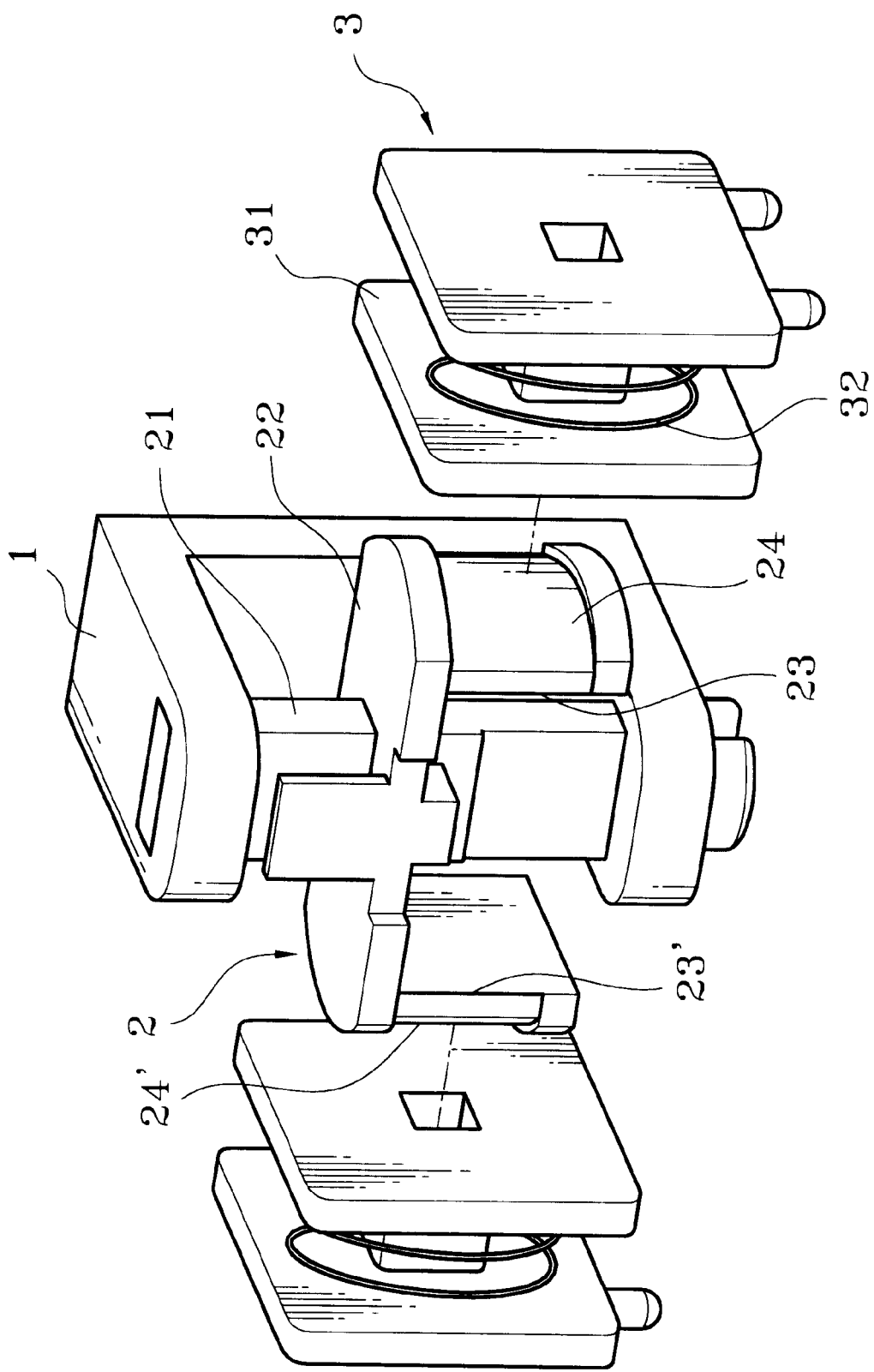
FIG. 1 is a perspective view of this invention.
Figure 2:
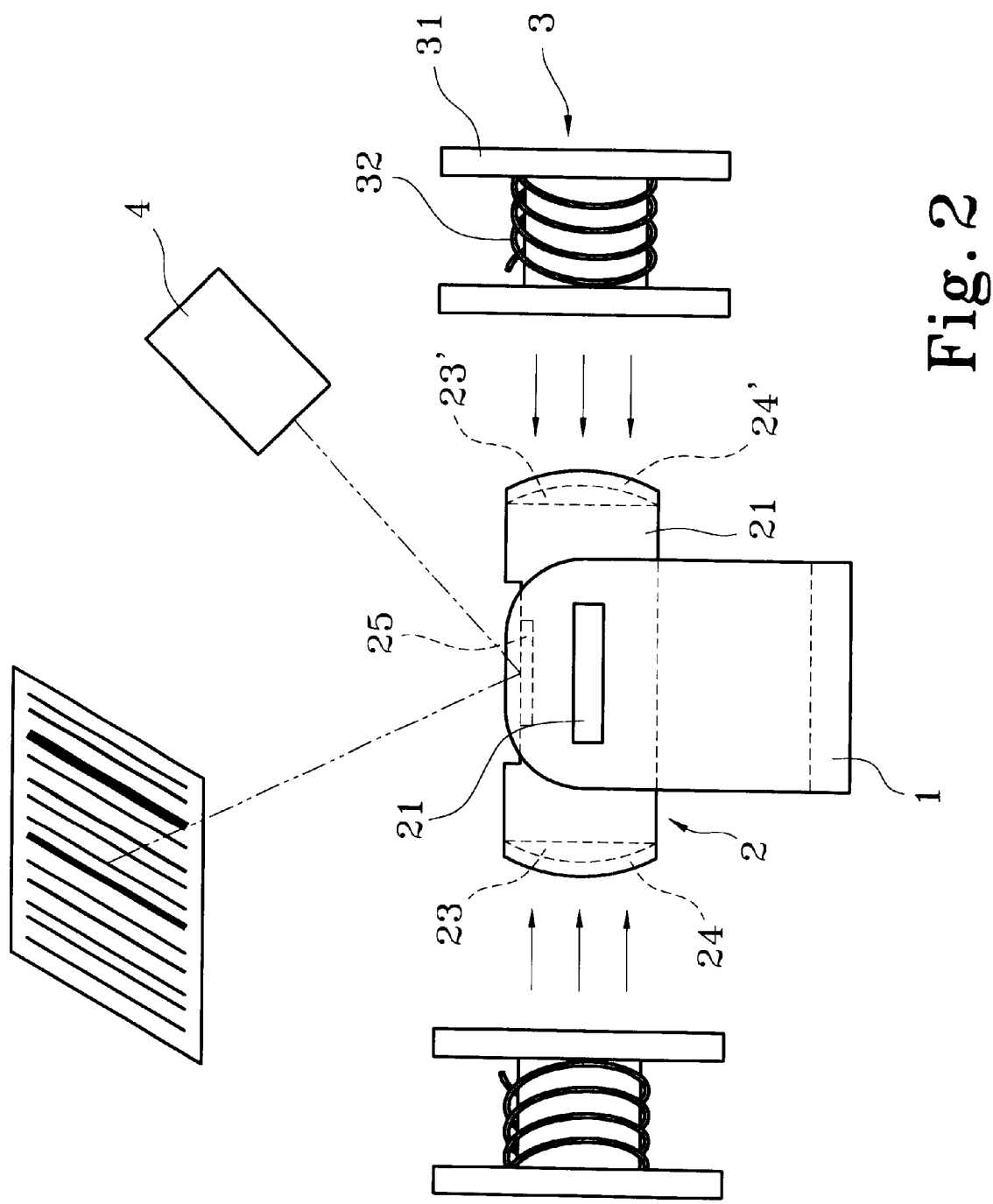
FIG. 2 is a schematic top view of this invention.

Referring to FIGS. 1 and 2, the scanning apparatus according to this invention includes an anchor frame 1, a twist means 2 and a driving means 3. The scanning apparatus is located in a barcode device. The twist means 2 may receive a projection light and reflect the light to a barcode (unmarked) attached to an object (not show) to be scanned for processing barcode scanning operation.

The anchor frame 1 is made of a metallic material or plastic material for holding the twist means 2.

The twist means 2 includes a formed member 21 made from a material of high elasticity coefficient such as silicon rubber, rubber or the like. There is a holding beam 22 mounted on the formed member 21. The holding beam 22 has two ends which have respectively a recess 23 and 23'. The recess 23 and 23' have respectively a magnetic element 24 and 24' located therein. The magnetic element 24 and 24' may be driven by the magnetic force generated by the driving means 3 when it is magnetized and consequently twist the formed member 21. When the magnetic elements 24 and 24' are free from the magnetic force, the twisted formed member 21 releases the twist elastic force. The inertia of the formed member 21 may move the formed member 21 in another direction and returning to its original position. On the holding beam 22, there is mounted a reflection element 25 made of, but not limit to, a mirror, an aluminum foil or any other metallic plate which has a reflective surface for reflecting the light generated by a laser light source 4 to the barcode of the object (not show).

The driving means 3 includes two sets of coil bracket 31 located at two sides of the holding beam 22. Each coil bracket 31 has a coil 32 surrounding thereon. When the driving means 3 is magnetized and generates magnetic force, the magnetic element 24 and 24' will be driven; whereby form the scanning apparatus for the barcode device.

Figure 3:
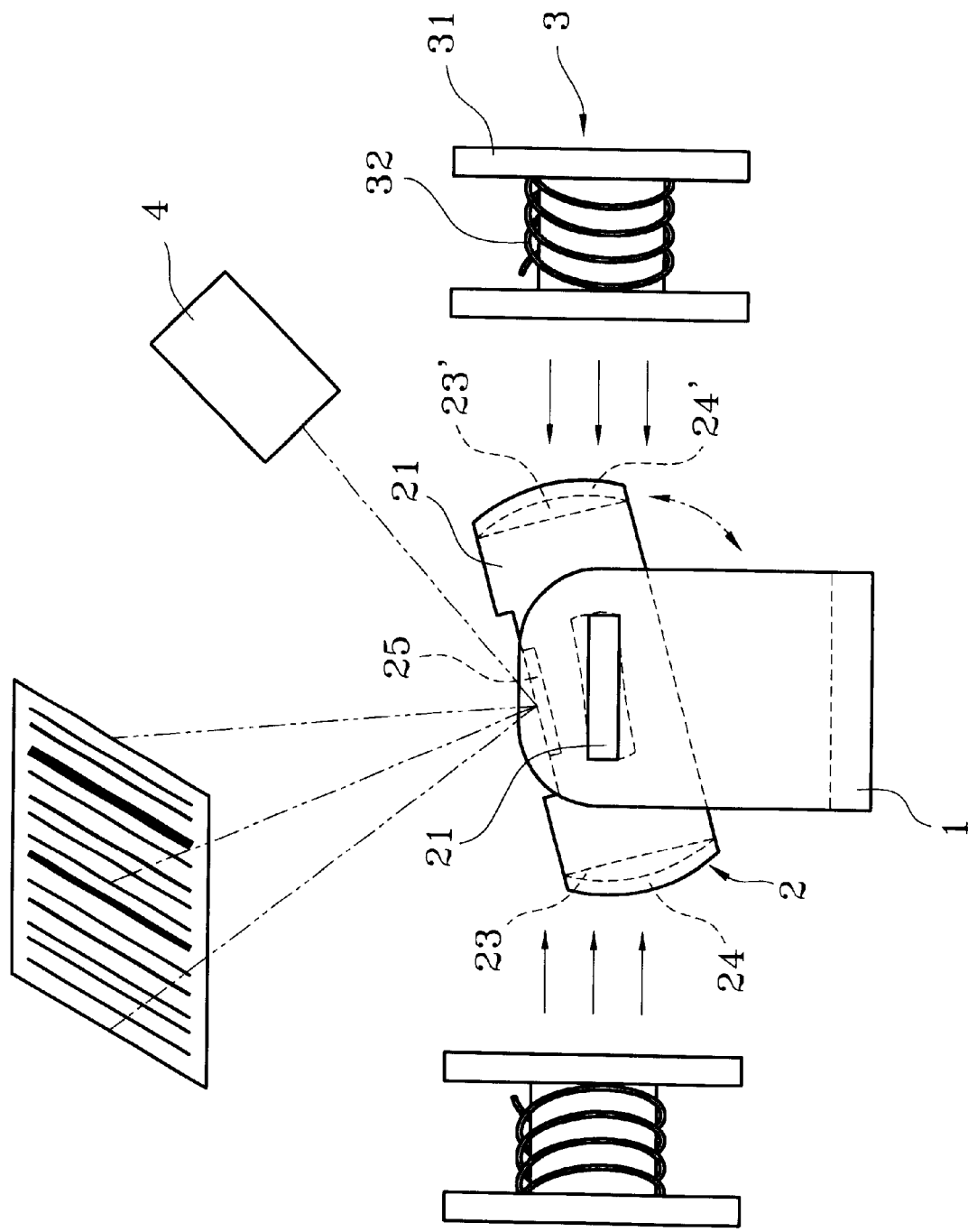
FIG. 3 is a schematic top view of this invention in use.

FIGS. 2 and 3 illustrate different states of this invention in use according to the embodiment shown in FIG. 1. When the coil 32 is magnetized, the driving means 3 will generate magnetic force to produce a corresponding force against the magnetic element 24 and 24'. As a result, the formed member 21 will be turned and twisted. When the magnetic force of the coil 32 is absent, the formed member 21 will turn clockwise or counterclockwise resulting from the counter reaction force and inertia thereof, consequently drives the holding beam 22 and the reflection element 25 located thereon turn concentrically. Hence if the coil 32 is magnetized at suitable time, the motion will continue.

Figure 4:
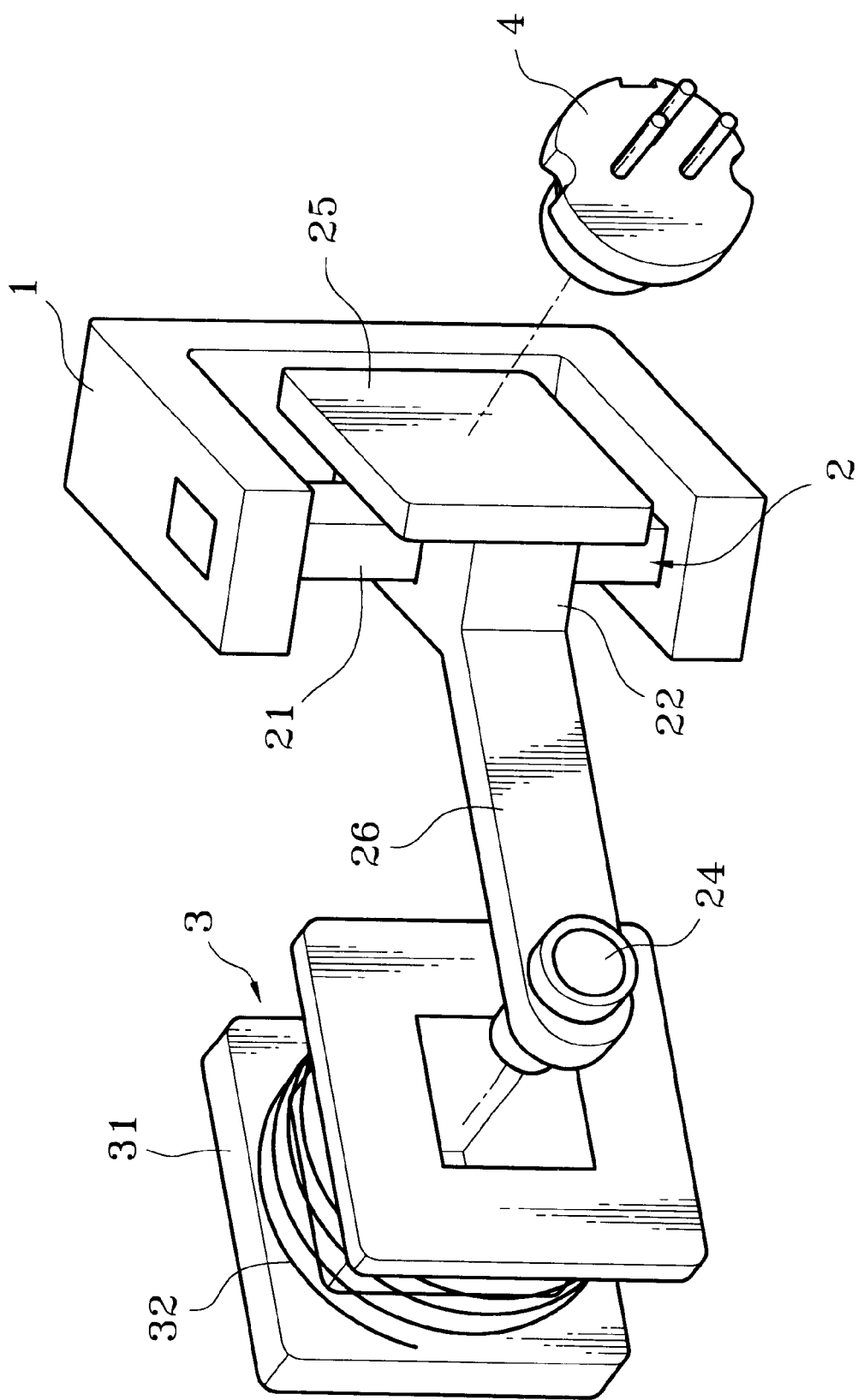
FIG. 4 is a schematic perspective view of another embodiment of this invention.

FIG. 4 shows another embodiment of this invention. The scanner apparatus includes an anchor frame 1 made of a metallic or plastic material for holding a twist means 2 thereon. The twist means 2 includes a formed member 21 made from a material of high elasticity coefficient such as silicon rubber, rubber or the like. There is a holding beam 22 mounted on the formed member 21. The holding beam 22 has one side engaged with a rod 26 which is extended sideward. The rod 26 has a free end which has a magnetic element 24 mounted thereon. The magnetic element 24 may be driven by a magnetized driving means 3 and consequently twists the formed member 21. When the magnetic element 24 is free from the magnetic force, the twisted formed member 21 releases the twist elastic force. The inertia of the formed member 21 may move the formed member 21 in another direction and returning to its original position. On the holding beam 22, there is mounted a reflection element 25 made of, but not limit to, a mirror, an aluminum foil or any other metallic plate which has a reflective surface for reflecting the light generated by a laser light source 4 to the barcode of an object (not shown in the figure).

The driving means 3 includes a coil bracket 31 and a coil 32 surrounding the coil bracket 31 which is located at the rear side of the rod 26. When the driving means 3 is magnetized and generates magnetic force, the magnetic element 24 will be driven; whereby form the scanning apparatus for the barcode device.

Figure 5:
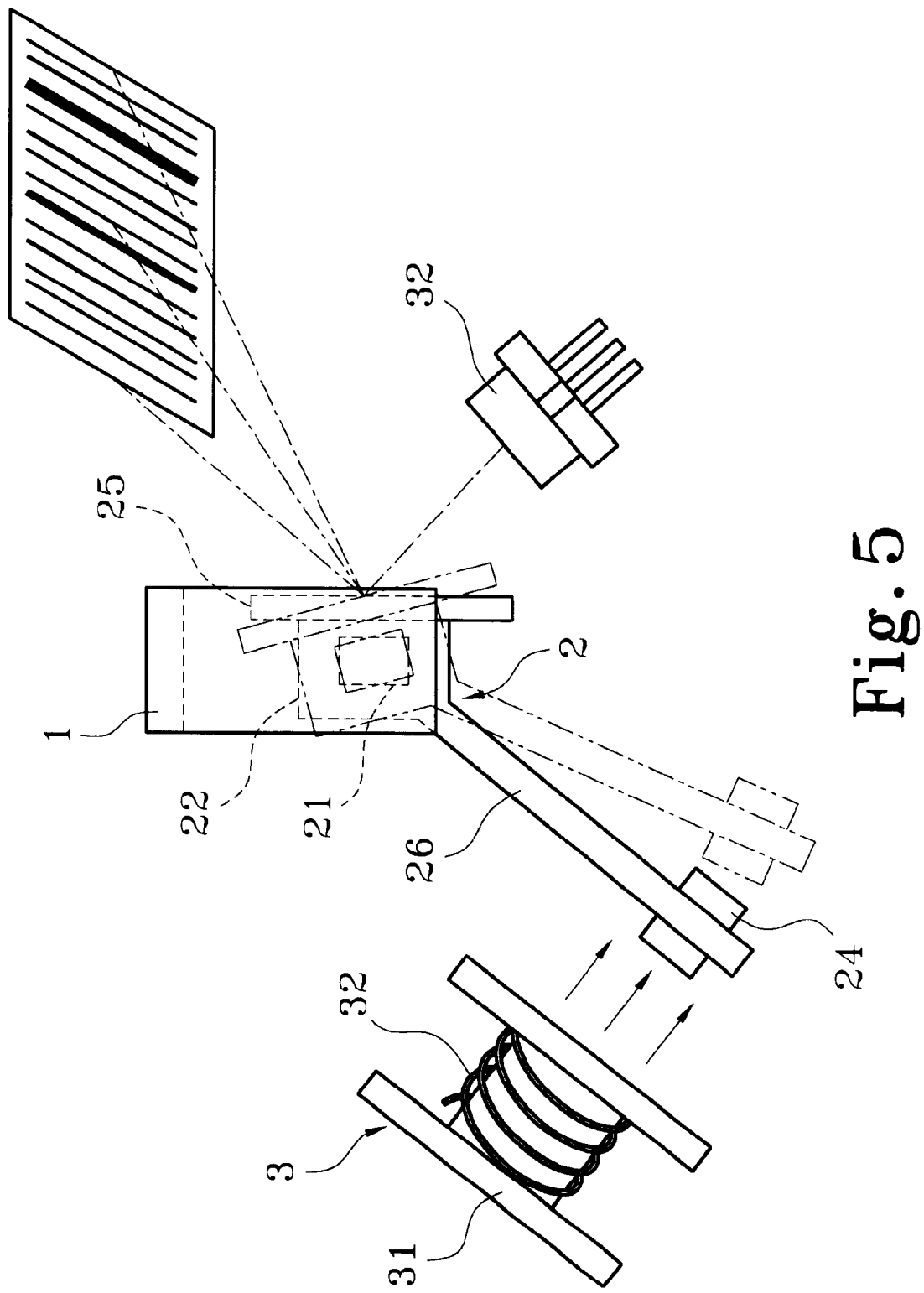
FIG. 5 is a schematic top view of this invention according to FIG. 5, in use.

FIG. 5 shows the embodiment of FIG. 4 in use. When the coil 32 is magnetized, the driving means 3 will generate magnetic force to produce a corresponding force to attract the magnetic element 24 and move the rod 26. As a result, the formed member 21 will be twisted. When the magnetic force of the coil 32 is absent, the formed member 21 will turn clockwise or counterclockwise resulting from the counter reaction force and inertia thereof, consequently drives the holding beam 22 and the reflection element 25 turn concentrically. Hence if the coil 32 is magnetized at suitable time, the motion will continue.

According to this invention, the formed member 21 is made from a material of high elasticity coefficient, hence material variation is smaller for same movement angle during scanning operation. Hence response time is faster. As a result, barcode scanning speed may be increased. As there is no spindle, production and assembly is easier. Furthermore, there is no friction during the movement. All this makes the scanning apparatus of this invention more desirable for barcode devices.

It may thus be seen that the objects of the present invention set forth herein, as well as those made apparent from the foregoing description, are efficiently attained. While the preferred embodiments of the invention have been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An improved scanning apparatus for use in a barcode device, comprising:

a twist means including a formed member and a holding beam mounted on the formed member, the holding beam having a reflection element located thereon and two ends each having a recess, each recess having a magnetic element disposed therein; and a driving means located at two sides of the twist means;

wherein the formed member is made from a material of high elasticity coefficient selected from the group consisting of silicon rubber and rubber, said formed member being arranged to twist upon application of a corresponding force resulting from interaction between the magnetic elements and a magnetic force generated by the driving means when the driving means is magnetized, and to move the reflection element concentrically as a result of a counter reaction force and the inertia of the formed member when the magnetic force is absent for projecting light to a barcode of an object to be scanned.

2. The improvement for scanning apparatus of claim 1 further having an anchor frame located in the barcode device.

3. The improvement for scanning apparatus of claim 2, wherein the anchor frame is selectively made of a metallic material or integrally formed with the casing of the barcode device.

4. The improvement for scanning apparatus of claim 1, wherein the reflection element is selectively made of a mirror, an aluminum foil or a metallic plate having a reflective surface.

5. The improvement for scanning apparatus of claim 1, wherein the driving means includes a coil seat and a coil surrounding the coil seat.

6. An improved scanning apparatus for use in a barcode device, comprising:

a twist means including a formed member and a holding beam mounted on the formed member, the holding beam having a reflection element located thereon and a rod extending sideward thereof, the rod having a free end which has a magnetic element disposed thereon; and a driving means located behind the rear end of the magnetic element;

wherein the formed member is made from a material of high elasticity coefficient selected from the group consisting of silicon rubber and rubber and is arranged to twist upon application of a corresponding force resulting from interaction between the magnetic element and a magnetic force generated by the driving means when magnetized, and to move the reflection element concentrically as a result of a counter reaction force and the inertia of the twist means when the magnetic force is absent for projecting light to a barcode of an object to be scanned.

* * * * *